No. 817,510. PATENTED APR. 10, 1906.
B. L. PACKARD.
MEAT ROLLER OR WRINGER.
APPLICATION FILED APR. 30, 1904. RENEWED SEPT. 30, 1905.
2 SHEETS—SHEET 1.
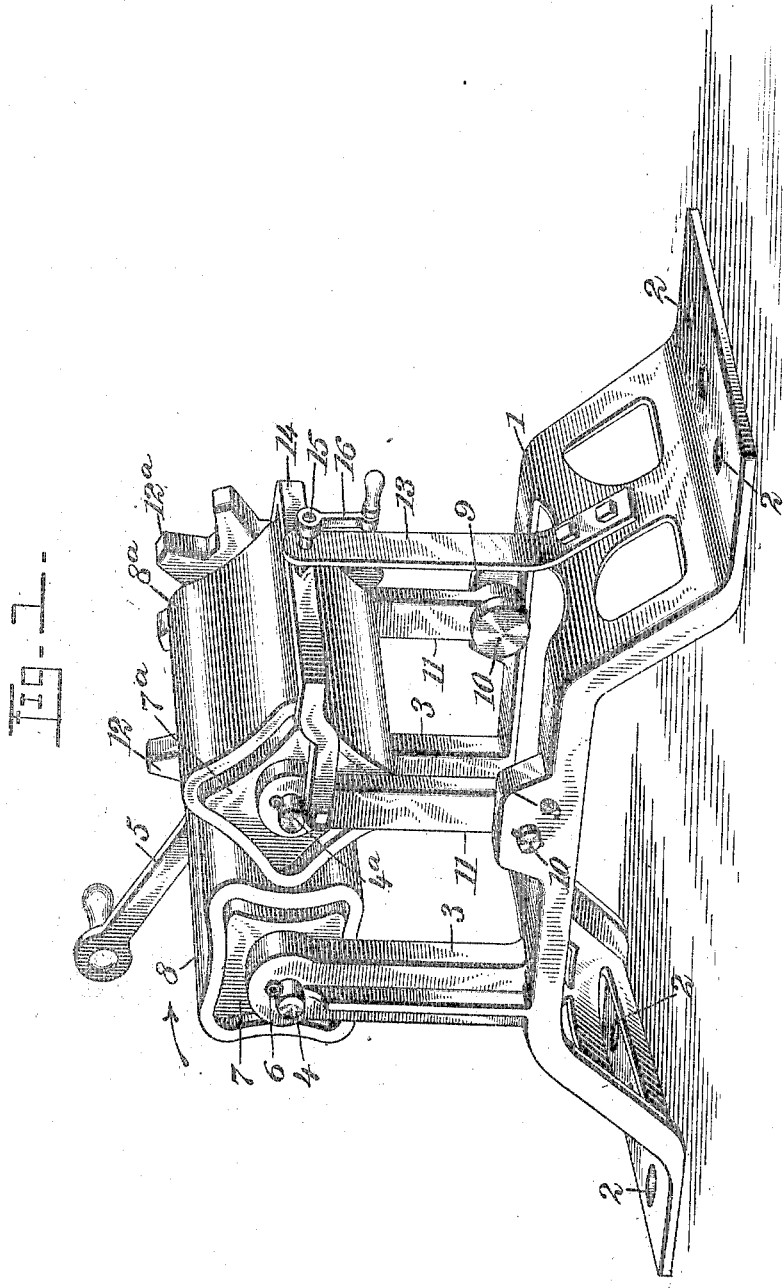
WITNESSES:
G. P. Kingsbury
Peter Morton
INVENTOR
Benjamin L. Packard
BY
Munn
ATTORNEYS No. 817,510. PATENTED APR. 10, 1906.
B. L. PACKARD.
MEAT ROLLER OR WRINGER.
APPLICATION FILED APR. 30, 1904. RENEWED SEPT. 30, 1905.
2 SHEETS—SHEET 2.
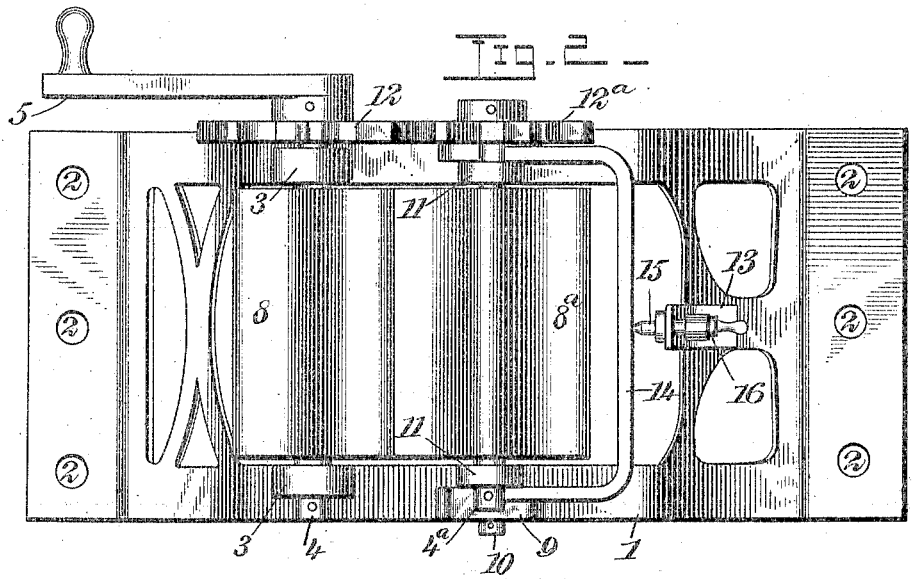
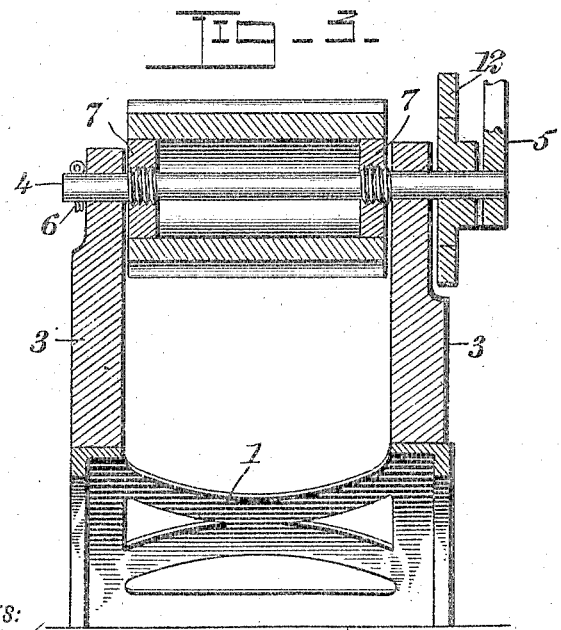
WITNESSES:
INVENTOR
Benjamin L. Packard
BY
ATTORNEYS

UNITED STATES PATENT OFFICE.

BENJAMIN L. PACKARD, OF DENVER, COLORADO.

MEAT ROLLER OR WRINGER.

No. 817,510.　　　Specification of Letters Patent.　　　Patented April 10, 1906.

Application filed April 30, 1904. Renewed September 30, 1905. Serial No. 280,832.

*To all whom it may concern:*

Be it known that I, BENJAMIN L. PACKARD, a citizen of the United States, and a resident of Denver, in the county of Denver and State of Colorado, have invented a new and Improved Meat Roller or Wringer, of which the following is a full, clear, and exact description.

This invention relates to rollers or wringers by means of which meat may be subjected to varying degrees of pressure; and the object of the invention is to provide an improved device of the character specified in which means is provided for regulating the pressure applied to the meat when passed through the device and in which means is also provided to permit the separation of the pressure-rollers to allow bones to pass between them without crushing and splintering.

With the objects above stated and others in view, as will hereinafter appear, the invention consists in the novel construction and arrangement of parts of a meat roller or wringer, as hereinafter fully described, and particularly pointed out in the appended claims, it being understood that changes in the minor structural details may be made without departing from the spirit of the invention or sacrificing its advantages.

Reference is to be had to the accompanying drawings, forming a part of this specification, in which similar characters of reference indicate corresponding parts in all the views.

Figure 1 is a perspective view of the improved meat roller or wringer. Fig. 2 is a top plan view, and Fig. 3 is a vertical sectional view through the pressure-roller to which the crank for operating the apparatus is applied.

Referring to the drawings, 1 designates a base which consists, preferably, of an arched casting provided with openings 2 for the reception of screws or other suitable fastening devices and having portions cut away for the sake of lightness. At one end of the arched portion of the base 1 a pair of uprights or standards 3 rise to a suitable distance above the base, upon which they are rigidly secured or with which they are formed integral. In the upper ends of the standards 3 3 bearings are formed for a shaft 4, upon which a crank 5 is secured at one end and through which a cotter-pin 6 or the like is passed at the other end. Between the standards 3 3 the shaft 4 is preferably threaded adjacent to each of the standards to receive supporting blocks or plates 7, which present concave edges, as best shown in Fig. 1. The blocks 7 afford support for a fluted shell 8, which forms one of the pressure-rollers and is preferably in contact with two of the opposite edges of each of the blocks or plates 7, but is spaced from the other two to permit each of said shells to buckle on two of its sides when subjected to excessive pressure, as shown.

About the middle of the base 1 a pair of bosses 9 form bearings for short shafts or pins 10, whose heads are disposed inwardly, as shown in Fig. 1, and which form supports for a pair of pivoted supporting members 11. The supporting members 11 afford bearings at their upper ends for a shaft $4^a$, similar to the shaft 4, upon which end plates or blocks $7^a$ are secured between the supporting members 11. The end plates or blocks $7^a$ are precisely similar to the end plates or blocks 7 and afford support for a fluted shell $8^a$, similar to the shell 8. In order to transmit motion from the shaft 4 to the shaft $4^a$ intermeshing gears 12 and $12^a$, respectively, are mounted upon the shafts 4 and $4^a$, as shown, and to hold the two gears continuously in mesh a spring 13 is mounted upon one end of the base 1 of the apparatus, and means is provided for transmitting the pressure of said spring to the supporting members 11. The preferred means for transmitting the pressure of the spring consists of a bail 14, secured upon the supporting members 11 near their upper ends, and a screw 15, which is threaded in the upper end of the spring 13 and provided with a crank 16 to impart rotation thereto. By means of the screw 15 the pressure exerted by the spring 13 upon the bail 14 and thence to the supports 11, upon which the pressure-roller $8^a$ is carried, may be regulated as may be desired, and the spring also serves the purpose of permitting the separation of the rollers when a bone passes between them.

The gears 12 and $12^a$, by means of which the two rollers 8 and $8^a$ are caused to rotate simultaneously at similar rates of rotation, are so mounted in relation to the rollers that one of the rounded ribs of one roller always corresponds to one of the depressions or grooves between adjacent ribs upon the other roller, thus insuring a substantially uniform pressure upon the meat in its passage between the rollers as long as the adjusting-screw 15 is not varied in adjustment.

In the operation of the device the adjusting-screw 15 is set to impart to the bail 14 and the structure associated therewith the desired amount of pressure, and then motion in the direction indicated by the arrow in Fig. 1 is imparted to the roller 8 by means of the crank 5. The meat is then fed downward between the two rollers and the juice thereof is extracetd wholly or in part, as may be required. This juice can be caught in any suitable receptacle and made use of in the preparation of bouillon, beef-tea, and the like. The meat after passing through the apparatus may be wholly or partially deprived of its juice, according as the screw 15 is set to exert great or small pressure upon the meat, and the use made of the meat after passing through the apparatus will be determined by the condition in which it is left by the apparatus.

Having thus described my invention, I claim as new and desire to secure by Letters Patent—

1. The combination in a structure of the character specified, of a base, a pair of rigid standards on the base, a roller journaled in the upper ends of said standards, a pair of standards pivoted on the base adjacent to the rigid standards, a roller rotatably mounted in the pivoted standards, a bail carried by said pivoted standards and projecting therefrom in the direction away from the rigid standards, a spring secured at its lower end to the base and at its upper end exerting pressure upon said bail at about the middle thereof to force said rollers normally into contact, and means for regulating the pressure of said spring upon said bail, said means comprising a cranked screw, threaded in the upper end of said spring and extending from the spring into engagement with the bail.

2. The combination in a structure of the character specified, of a rigid supporting structure, a shaft journaled therein, blocks mounted on said shaft near the ends, a fluted shell mounted on said blocks and spaced from said blocks upon two opposite sides thereof, a pivoted supporting structure, a shaft journaled in said pivoted supporting structure, a shell mounted on said shaft and corresponding in shape and construction to the first-mentioned shell, and means for yieldably pressing said pivoted supporting structure toward the rigid supporting structure.

3. The combination in a structure of the character specified, of a pair of intergeared quadrilateral rollers normally held yieldably in contact, said rollers comprising quadrilateral blocks, parallel shafts on which said blocks are carried, and fluted shells mounted on said blocks and spaced from their respective blocks on two opposite sides thereof and having concave faces and rounded corners and being so arranged that a corner upon one roller will always correspond to a concave face of the other.

In testimony whereof I have signed my name to this specification in the presence of two subscribing witnesses.

BENJAMIN L. PACKARD.

Witnesses:
C. J. ROLLANDET,
K. M. STUMP.